(12) United States Patent
Roux et al.

(10) Patent No.: US 11,660,946 B2
(45) Date of Patent: May 30, 2023

(54) SEAL ASSEMBLY

(71) Applicant: CQLT SAARGUMMI TECHNOLOGIES S.À.R.L., Remich (LU)

(72) Inventors: Sébastien Roux, St-Aubin-Celloville (FR); Philippe Sans, Luisant (FR)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 653 days.

(21) Appl. No.: 16/608,418

(22) PCT Filed: May 22, 2018

(86) PCT No.: PCT/EP2018/000269
§ 371 (c)(1),
(2) Date: Oct. 25, 2019

(87) PCT Pub. No.: WO2018/224178
PCT Pub. Date: Dec. 13, 2018

(65) Prior Publication Data
US 2020/0086728 A1 Mar. 19, 2020

(30) Foreign Application Priority Data
Jun. 9, 2017 (DE) ...................... 10 2017 112 720.8

(51) Int. Cl.
*B60J 10/76* (2016.01)
*B60J 10/79* (2016.01)
(Continued)

(52) U.S. Cl.
CPC ............... *B60J 10/79* (2016.02); *B60J 10/16* (2016.02); *B60J 10/248* (2016.02); *B60J 10/88* (2016.02);
(Continued)

(58) Field of Classification Search
CPC . B60J 10/79; B60J 10/16; B60J 10/248; B60J 10/88; B60J 10/27; B60J 10/17; B60J 10/24; B60J 10/246; F15J 15/025
(Continued)

(56) References Cited

U.S. PATENT DOCUMENTS

| 4,490,942 A | 1/1985 | Arnheim |
| 5,159,781 A | 11/1992 | Glossop, Jr. |

(Continued)

FOREIGN PATENT DOCUMENTS

| CN | 103171412 A1 | 6/2013 |
| DE | 7411434 U | 7/1974 |

(Continued)

OTHER PUBLICATIONS

International Search Report, dated Aug. 20, 2018, 2 Pages.
(Continued)

*Primary Examiner* — Jerry E Redman
(74) *Attorney, Agent, or Firm* — Lucas & Mercanti, LLP; Klaus P. Stoffel

(57) ABSTRACT

A seal assembly including a seal element which has at least one seal portion for sealing a vertically movable window pane of a vehicle door against a vertical window frame limb. The seal element additionally has a seal portion for forming a gap which is formed between a center that borders the vehicle door and a vertical window pane edge side facing the center.

13 Claims, 2 Drawing Sheets

(51) Int. Cl.
*B60J 10/16* (2016.01)
*B60J 10/248* (2016.01)
*B60J 10/88* (2016.01)
*F16J 15/02* (2006.01)
*B60J 10/246* (2016.01)
*B60J 10/27* (2016.01)

(52) U.S. Cl.
CPC ............ *F16J 15/025* (2013.01); *B60J 10/246* (2016.02); *B60J 10/27* (2016.02)

(58) Field of Classification Search
USPC .............................. 49/440, 441, 495.1, 498.1
See application file for complete search history.

(56) References Cited

U.S. PATENT DOCUMENTS

| | | | | |
|---|---|---|---|---|
| 5,174,065 A * | 12/1992 | Schlicht | ................ | E06B 7/2312 49/470 |
| 5,209,019 A * | 5/1993 | Morita | .................... | B60J 10/79 49/495.1 |
| 5,261,188 A * | 11/1993 | Vaughan | .................. | B60J 10/75 49/377 |
| 5,319,883 A * | 6/1994 | Gueneau | .................. | B60J 10/79 49/489.1 |
| 5,950,366 A * | 9/1999 | Uhlmeyer | ................ | B60J 10/70 296/213 |
| 8,726,575 B1 * | 5/2014 | Vulpitta | ................ | E06B 7/2314 49/470 |
| 9,027,284 B2 * | 5/2015 | Murree | .................... | B60J 10/87 49/495.1 |
| 9,038,319 B2 * | 5/2015 | Kuwabara | .............. | B60J 10/777 49/498.1 |
| D775,366 S * | 12/2016 | Mitchell | ..................... | D25/48.2 |
| 9,597,949 B2 * | 3/2017 | Nojiri | ...................... | B60J 10/76 |
| 10,427,511 B2 * | 10/2019 | Blottiau | .................. | B60J 10/79 |
| 10,704,321 B2 * | 7/2020 | Ohrstrom | .............. | E06B 7/2316 |
| 11,052,731 B2 * | 7/2021 | Lorentsson | ................ | B60J 1/17 |
| 11,117,455 B2 * | 9/2021 | Roux | ....................... | B60J 10/32 |
| 2006/0021282 A1 * | 2/2006 | Tamaoki | .................. | B60J 10/74 49/441 |
| 2013/0160375 A1 | 6/2013 | Kuwabara | | |
| 2015/0089878 A1 * | 4/2015 | Otsuka | ..................... | B60J 10/88 49/440 |
| 2017/0182871 A1 * | 6/2017 | Taketomo | ................ | B60J 10/25 |
| 2020/0086728 A1 * | 3/2020 | Roux | ....................... | B60J 10/16 |
| 2020/0180405 A1 * | 6/2020 | Blottiau | ................... | B60J 10/79 |

FOREIGN PATENT DOCUMENTS

| | | | | |
|---|---|---|---|---|
| DE | 2924309 A1 | 12/1980 | | |
| DE | 3119366 A1 | 1/1983 | | |
| DE | 3200322 A1 | 7/1983 | | |
| DE | 69114661 T2 | 5/1996 | | |
| DE | 20221602 U1 * | 8/2006 | ............. | B60J 10/16 |
| EP | 0308377 A1 | 3/1989 | | |
| EP | 2008851 A2 | 12/2008 | | |
| EP | 2607128 A2 * | 6/2013 | ............. | B60J 10/16 |
| EP | 3050730 A1 | 8/2016 | | |
| EP | 3118040 A1 | 1/2017 | | |
| GB | 714554 A | 9/1954 | | |
| JP | 2011230632 A | 11/2011 | | |
| WO | WO-2018224178 A1 * | 12/2018 | ............. | B60J 10/16 |

OTHER PUBLICATIONS

German Search Report, dated Feb. 6, 2018, 8 Pages.
Chinese Patent Office issued Office Action dated Jul. 25, 2022 regarding parallel Chinese Patent Application No. 201880029978.7, 6 pages.

* cited by examiner

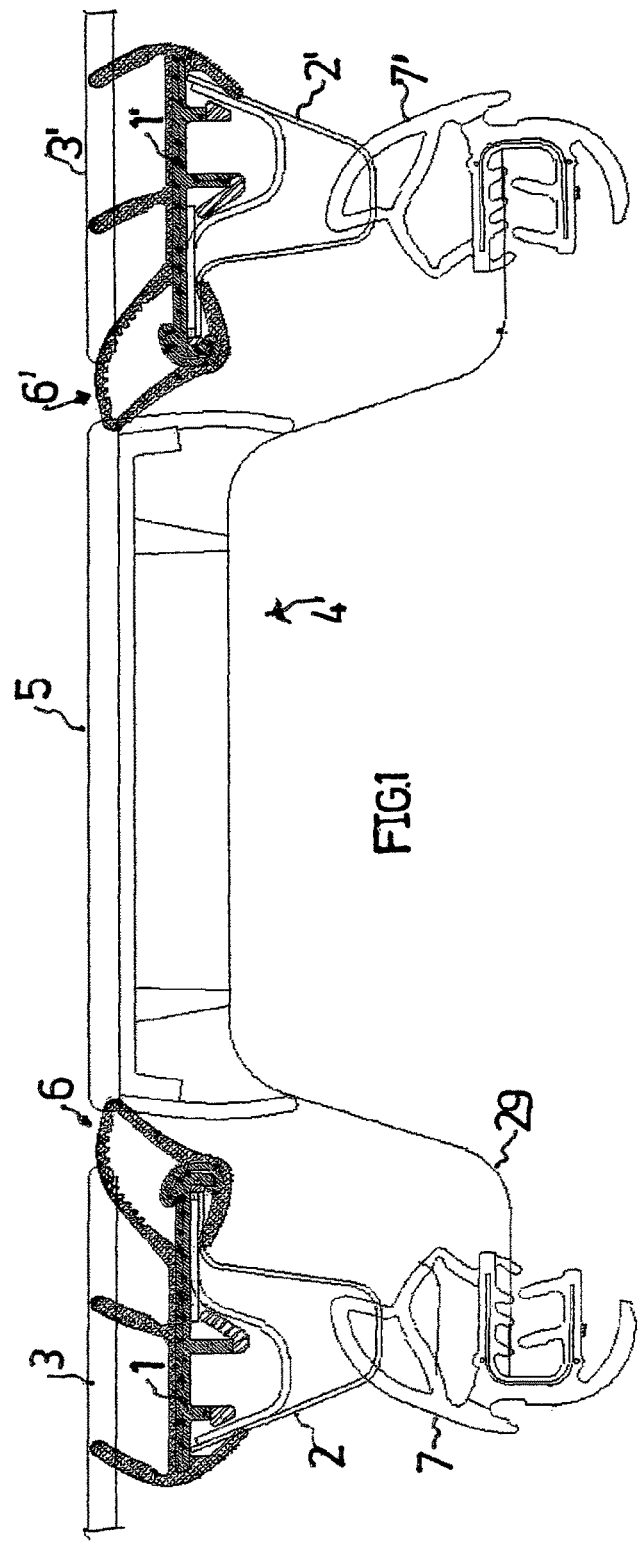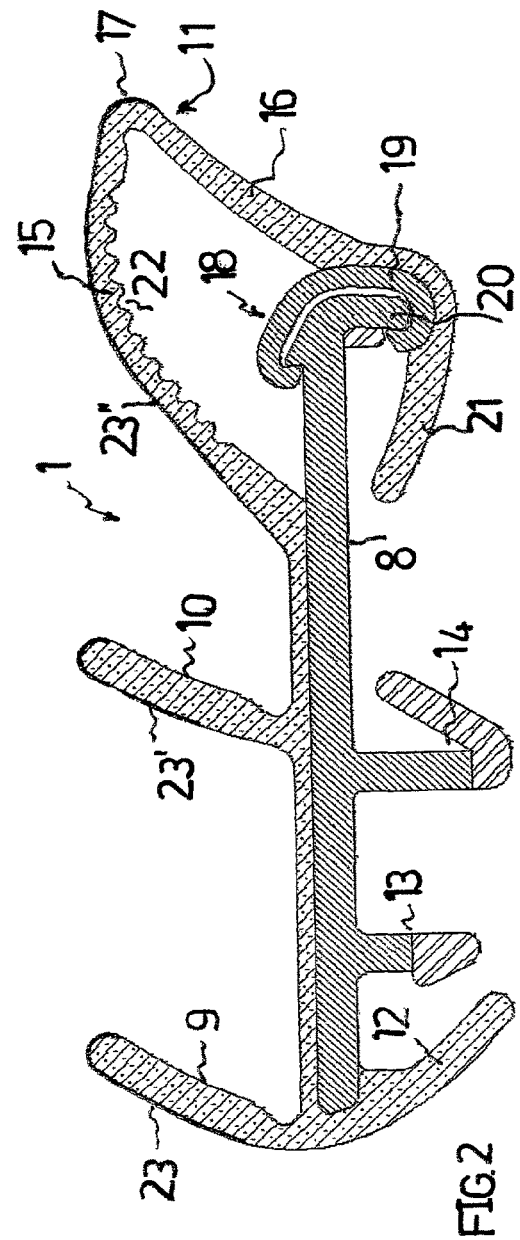

SEAL ASSEMBLY

The present application is a 371 of International application PCT/EP2018/000269, filed May 22, 2018, which claims priority of DE 10 2017 112 720.8, filed Jun. 9, 2017, the priority of these applications is hereby claimed and these applications are incorporated herein by reference.

BACKGROUND OF THE INVENTION

The invention relates to a sealing arrangement having a sealing element, which has at least one sealing portion for sealing a vertically movable window of a vehicle door in relation to a vertical window-frame limb.

A conventional sealing arrangement of this type can be gathered, in horizontal section, from accompanying FIG. 4. The sealing arrangement comprises a sealing element (1), which is fitted on a vertical window-frame limb (2) of the vehicle door. A window (3), which can be moved vertically (perpendicularly to the plane of the paper), has a vertical peripheral side engaging in a U-shaped portion of the sealing element (1), wherein the U-shaped portion of the sealing element (1), for its part, is inserted into a U-shaped depression in the window-frame limb (2).

SUMMARY OF THE INVENTION

The invention creates a novel seal of the type mentioned in the introduction, which is characterized in that the sealing element also has a sealing portion for sealing a gap, wherein the gap is formed between a body pillar, which is adjacent to the vehicle door, and a vertical peripheral side of the window, said vertical peripheral side being directed toward the body pillar.

According to this solution of the invention, it is possible for the vertical window-frame limb of the vehicle door to be offset all the way inward in relation to the window and for a body pillar, in particular a B-pillar, to adjoin the window directly, separated only by the gap.

The outer surface of the window is particularly preferably flush with an outer surface of the body pillar, which can advantageously ensure both a good appearance and good aerodynamic properties of the vehicle body.

In a further preferred embodiment of the invention, the gap-sealing sealing portion is of tubular design. The tube geometry advantageously allows the sealing portion to butt reliably against both the body pillar and the window, and therefore allows the gap to be closed off in a reproducible manner.

The tubular sealing portion preferably has a non-circular cross-sectional shape and butts against the body pillar in particular by way of a tube-wall corner. The latter ensures a high level of surface-area pressing action and therefore reliable sealing. Of course, the tube-wall corner is understood to mean a wall progression with a comparatively small rounding radius.

In a further configuration of the invention, the tubular sealing portion comprises two tube-wall portions, which run toward one another at an acute angle to form the tube-wall corner. This cross-sectional geometry makes it possible to achieve a particularly high level of surface-area pressing action between the sealing portion and the body pillar.

The tube-wall portions can extend at a distance apart from one another from a core part of the sealing element.

The core part preferably consists of a material which is more rigid than the rest of the material of the sealing element, e.g. of a thermoplastic material, in particular of polypropylene (PP). The rest of the material used to form sealing portions can possibly be an elastomer, in particular a thermoplastic elastomer.

In a further advantageous configuration of the invention, at least one of the two tube-wall portions is curved in the direction of the window and butts against the window in particular by way of a curved tube-wall portion.

The tube-wall portion which butts against the window preferably has weak points, which increases the flexibility of said tube-wall portion.

The tube-wall portion which butts against the window expediently comprises a sliding layer, which extends preferably over, and around, the tube-wall corner. The arrangement in which the sliding layer extends around the corner gives rise to a considerable reduction in wear when the vehicle door is being frequently opened and closed.

In a further preferred embodiment of the invention, the sealing portion is designed in the form of a tube which is closed by a latching connection between tube-wall ends.

BRIEF DESCRIPTION OF THE DRAWINGS

The invention will be explained in more detail hereinbelow with reference to exemplary embodiments and the accompanying drawings, which relate to said exemplary embodiments and in which:

FIG. 1 shows sealing arrangements according to the invention having different sealing elements, FIG. 2 shows one of the sealing elements used in the arrangements from FIG. 1.

DETAILED DESCRIPTION OF THE INVENTION

Figure 3:
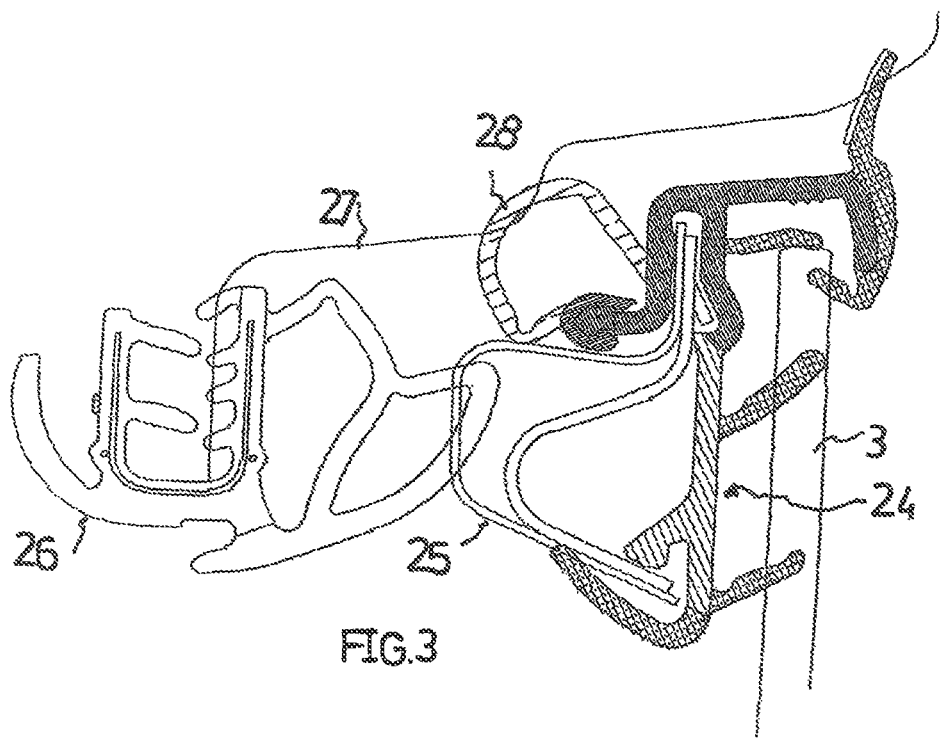
FIG. 3 shows a sealing arrangement on an upper window-frame limb, this sealing arrangement supplementing the sealing arrangements from FIG. 1.
Figure 4:
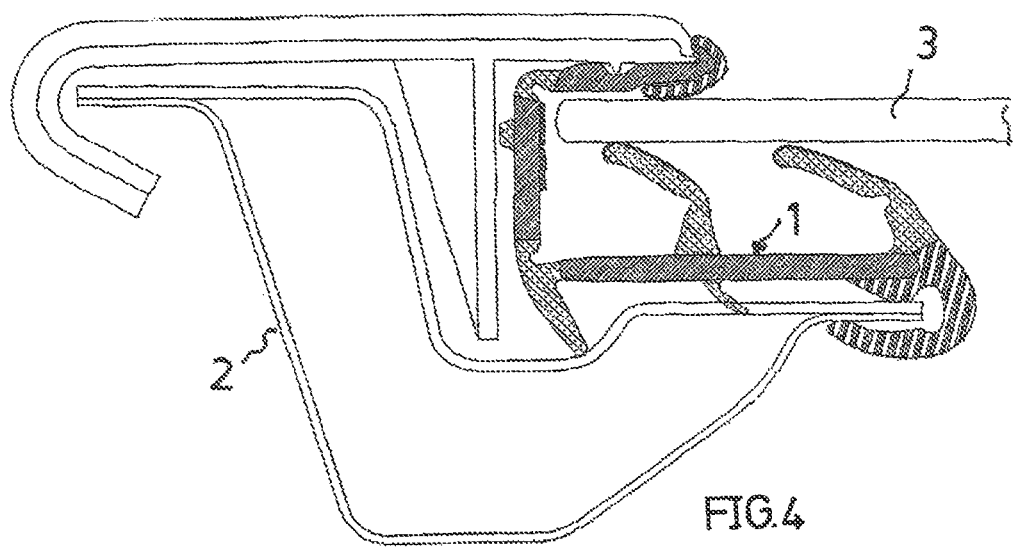
FIG. 4 shows a sealing arrangement according to the prior art.

Sealing arrangements shown in horizontal section in FIG. 1 each comprise an extruded sealing element 1, 1', which is connected to a respective window-frame limb 2, 2' of a vehicle door. The sealing elements 1, 1' each butt against a vertically movable window 3, 3', respectively, of the vehicle door.

A body pillar 4, which is provided between the vehicle doors and is often referred to as a B-pillar, has an outer surface 5, which in the closed state of the vehicle doors (as shown), terminates flush with the outer surfaces of the windows 3, 3'. A gap 6, 6' formed between the body pillar 4 and those peripheral sides of the windows 3, 3' which are directed toward said body pillar is sealed in addition by the respective sealing element 1, 1'.

In the closed state of the vehicle doors, the window-frame limb 2, 2' is sealed in relation to a door-frame part 29 of the vehicle body by a respective sealing element 7, 7'.

The sealing element 1 which is illustrated separately, by way of example, in FIG. 2 has a basically strip-form core part 8 made of a comparatively stiff thermoplastic material, e.g. polypropylene (PP). Connected to the core part 8 are tongue-form sealing elements 9 and 10, for butting against the window 3, and a tubular sealing element 11, for butting both against the window 3 and against the body pillar 4. The sealing elements 9 to 11 consist of a material which is softer than the material of the core part 8, in particular of an elastomer material, preferably a thermoplastic elastomer. Portions 12 to 14 projecting from the core part 8 on the side which is directed away from the window 3 consist, in accordance with the different hatchings, partly of the firmer material of the core part 8 and partly of the softer material of the sealing portions 9, 10, and they serve to fasten the sealing element 1 on the window-frame limb 2.

The tubular sealing portion 11 has tube-wall portions 15 and 16 which consist of the softer material, which run toward one another at an acute angle to form a tube-wall corner 17 and are curved in the direction of the window 3. Together with a portion of the core part 8, the tube-wall portions 15, 16 form the tubular sealing portion 11. At 18, a latching connection is formed between one end of the core part 8 and that end of the tube-wall portion 16 which is directed away from the tube-wall corner 17, wherein a latching bracket 19, which is connected to the tube-wall portion 16 and is made of the firmer thermoplastic material, engages behind a widened end portion 20 provided on the core part 8. An extension 21 of the tube-wall portion 16, said extension being guided past the latching bracket 19, serves to connect the sealing element 1 to the window-frame limb 2. The tube-wall portion 15 has longitudinal grooves 22, which provides said portion with a particular degree of flexibility.

The sealing portions 9 to 11 are each provided with a sliding layer 23, 23' and 23", respectively, wherein the sliding layers 23, 23' are guided around the respective free end of the lip-form sealing portions 9, 10 and the sliding layer 23" is guided around the tube-wall corner 17.

The sealing elements 1, 1' described in FIGS. 1 and 2 are each connected to a sealing element 24, which is illustrated in FIG. 3, via a corner part (not shown) which is molded on by injection molding. The sealing element 24 is fitted on an upper window-frame limb 25 of the vehicle door.

With the vehicle door closed, the upper window-frame limb 25 is sealed in relation to a frame part 27 of the vehicle body by a sealing element 26. Further sealing of the vehicle door or of the upper frame limb in relation to the frame part 27 forms a tubular portion 28 of the sealing element 24.

The sealing elements 1, 1' (and also the sealing element 24) are formed by multiple extrusion, the core part 8 being extruded first of all. In a second extrusion step, all those portions of the extruded sealing means 1, 1' which consist of the softer material are molded onto the core part 8. A third extrusion step involves the extrusion of the latching bracket 19 and the connection thereof to the tube-wall portion 16 and to the extension 21. As an alternative, it is also possible for the core part 8 and the latching bracket 19 to be extruded simultaneously and the portions made of softer material then to be molded on by extrusion.

In the closed state of the vehicle window, the tongue-form sealing portions 9, 10 have their ends, and the tubular sealing portion 11 has its tube-wall portion 15, butting with sealing action against the window 3, 3'.

In the closed state of the vehicle doors, the tube-wall portion 15 seals the gap 6, 6' between the relevant peripheral side of the respective window 3, 3' and the body pillar 4 in that the tubular sealing portion 11 butts against the body pillar 4 by way of its tube-wall corner 17. The geometry of the tubular sealing portion 11 along with the tube-wall portions 15, 16 running toward one another ensures a suitable contact pressure.

The invention claimed is:

1. A sealing arrangement comprising a sealing element that has at least one sealing portion configured to seal a vertically movable window of a vehicle door in relation to a vertical window-frame limb of the vehicle door, wherein the sealing element also has: a core part of a first material, the at least one sealing portion being on a first side of the core part; three projections that extend from a side of the core part opposite the first side, a second and a third of the three projections being of the first material and having sealing/mounting portions of a second material, a first and the second of the three projections being configured to engage one end of the window-frame the limb; and a tubular sealing portion that extends from the core part and mounts to the window-frame limb to seal a gap between a body pillar, which is adjacent to the vehicle door, and a vertical peripheral side of the window that is directed toward the body pillar, wherein the tubular sealing portion comprises two tube-wall portions, one of the tube-wall portions having an extension that together with one end of the core part forms a U-shape that mounts to an opposite end of the window-frame limb.

2. The sealing arrangement according to claim 1, wherein an outer surface of the window is flush with an outer surface of the body pillar.

3. The sealing arrangement according to claim 1, wherein the tubular sealing portion has a non-circular cross-sectional shape and butts against the body pillar.

4. The sealing arrangement according to claim 3, wherein the cross-sectional shape has a tube-wall corner that butts against the body pillar.

5. The sealing arrangement according to claim 4, wherein the two tube-wall portions run toward one another at an acute angle to form the tube-wall corner.

6. The sealing arrangement according to claim 5, wherein the sealing element has a core part and the tube-wall portions extend at a distance apart from one another from the core part of the sealing element.

7. The sealing arrangement according to claim 6, wherein the core part consists of a material which is firmer than material that forms the sealing portions of the sealing element.

8. The sealing arrangement according to claim 7, wherein the core part is a thermoplastic material and a remainder of the sealing element is an elastomer.

9. The sealing arrangement according to claim 8, wherein the thermoplastic material is polypropylene and the elastomer is a thermoplastic elastomer.

10. The sealing arrangement according to claim 5, wherein at least one of the two tube-wall portions is curved in a direction of the window and butts against the window by way of the curved tube-wall portion.

11. The sealing arrangement according to claim 10, wherein the tube-wall portion that butts against the window has weak points that increase flexibility of the tube-wall portion.

12. The sealing arrangement according to claim 10, wherein the tube-wall portion that butts against the window has a sliding layer that extends over and around the tube-wall corner.

13. The sealing arrangement according to claim 5, further comprising a latching connection between ends of the tube walls so as to close the tube.

* * * * *